(12) United States Patent
Sung et al.

(10) Patent No.: US 6,888,555 B2
(45) Date of Patent: May 3, 2005

(54) COLOR SYNCHRONIZATION METHOD AND COLOR LASER PRINTER

(75) Inventors: Bu-hyun Sung, Gyeonggi-do (KR); Chul-woo Lee, Gyeonggi-do (KR); Soon-kyo Hong, Seoul (KR); Young-woo Huh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 10/423,986

(22) Filed: Apr. 28, 2003

(65) Prior Publication Data

US 2003/0218668 A1 Nov. 27, 2003

(30) Foreign Application Priority Data

May 22, 2002 (KR) .................................. 10-2002-0028501

(51) Int. Cl.[7] .................................................. G03G 2/14
(52) U.S. Cl. ......................... 347/116; 347/234; 399/301
(58) Field of Search ................................. 347/234, 248, 347/116; 399/167, 301, 299

(56) References Cited

U.S. PATENT DOCUMENTS

| | | | | |
|---|---|---|---|---|
| 4,990,969 A | * | 2/1991 | Rapkin | 399/139 |
| 5,016,062 A | * | 5/1991 | Rapkin | 399/300 |
| 5,444,525 A | * | 8/1995 | Takahashi et al. | 399/76 |
| 6,269,229 B1 | * | 7/2001 | Yamamoto | 399/75 |

* cited by examiner

Primary Examiner—Huan Tran
(74) Attorney, Agent, or Firm—Stein, McEwen & Bui, LLP (57) ABSTRACT

A color synchronization method and a color laser printer form a color image by forming an electrostatic latent image on a photosensitive body using a laser scanning unit, developing the electrostatic latent image, and transferring the developed image onto a transfer belt. The printer includes a light source which radiates light, a timing belt which rotates the photosensitive body, a plurality of timing displays, which are provided on the timing belt at a constant interval, and on which the light radiated from the light source is incident, and a light receiving portion which detects the light reflected or transmitted by the timing displays. Synchronization for each color is controlled in response to a signal received by the light receiving portion.

59 Claims, 8 Drawing Sheets

COLOR SYNCHRONIZATION METHOD AND COLOR LASER PRINTER

CROSS-REFERENCE TO RELATED APPLICATIONS

This application claims the priority of Korean Patent Application No. 2002-28501, filed on May 22, 2002, in the Korean Intellectual Property Office, the disclosure of which is incorporated herein in its entirety by reference.

BACKGROUND OF THE INVENTION

1. Field of the Invention

The present invention relates to a color synchronization method and a color laser printer which achieves color synchronization by providing a timing display on a timing belt to rotate a photosensitive drum.

2. Description of the Related Art

In general, black-and-white laser printers transfer only black ink onto a sheet of paper, and thus one organic photoconductive cell (OPC) photosensitive drum is used in one laser scanning unit (LSU).

Figure 1:
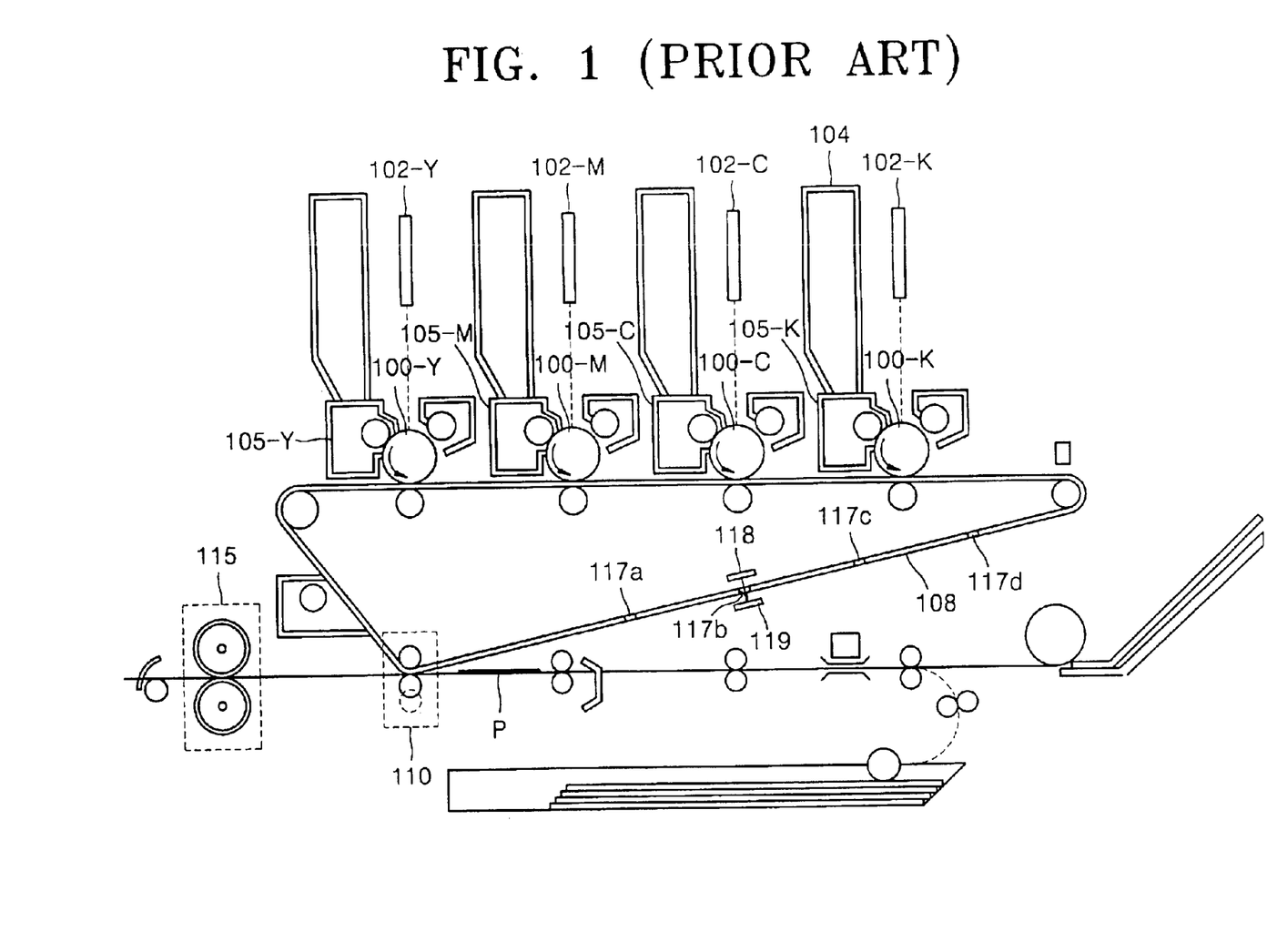
FIG. 1 shows a conventional color laser printer.

To the contrary, color laser printers should transfer ink having four colors, such as black (K), magenta (M), yellow (Y), and cyan (C), onto the paper, and thus four LSUs and four OPCs photosensitive drums which correspond to the respective four colors are required. As shown in FIG. 1, a conventional color laser printer includes a black OPC photosensitive drum 100-K, a cyan OPC photosensitive drum 100-C, a magenta OPC photosensitive drum 100-M, a yellow OPC photosensitive drum 100-Y, LSUs 102-K, 102-C, 102-M, and 102-Y which radiate light onto the black, cyan, magenta, and yellow OPC photosensitive drums 100-K, 100-C, 100-M, and 100-Y, respectively, charged to a predetermined potential so as to form each electrostatic latent image, developing units 105-K, 105-C, 105-M, and 105-Y which develop the electrostatic latent image using a developer having four colors, a transfer belt 108 which receives the developed image from the black, cyan, magenta, and yellow OPC photosensitive drums 100-K, 100-C, 100-M, and 100-Y to form a color image, a transfer unit 110 which transfers the color image of four colors from the transfer belt 108 onto a sheet of paper P, and a fusing unit 115 which heats and squeezes the paper P and fuses the transferred image on the paper P. Reference numeral 104 denotes a toner supply container supplying toner to the respective developing units 105-K, 105-C, 105-M, and 105-Y.

As described above, in order to realize a color image, the conventional color laser printer includes the black, cyan, magenta, and yellow OPC photosensitive drums 100-K, 100-C, 100-M, and 100-Y and the four LSUs 102-K, 102-C, 102-M, and 102-Y which correspond to the four colors.

Each LSU 102-K, 102-C, 102-M, or 102-Y radiates light onto a photosensitive medium, such as the corresponding OPC photosensitive drum 100-K, 100-C, 100-M, or 100-Y, and forms the electrostatic latent image on the corresponding one of the black, cyan, magenta, and yellow OPC photosensitive drums 100-K, 100-C, 100-M, and 100-Y. In this way, when the corresponding image developed on each photosensitive drum is transferred onto the transfer belt 108, black, cyan, magenta, and yellow images sequentially overlap on an identical line of the transfer belt 108 to form the color image onto the transfer belt 108. In this case, only if a line transferred for each color is placed correctly in an identical position of the transfer belt 108, a quality of the color image is improved. Thus, devices for transferring the corresponding image for each color to a precise position of the transfer belt 108 have been developed. Likewise, transferring the corresponding image for each color in the identical position of the transfer belt 108 is referred to as color synchronization.

In the conventional color laser printer, in order to realize the color synchronization, as shown in FIG. 1, first through fourth holes 117a, 117b, 117c, and 117d, which correspond to each color, are bored at predetermined intervals on the transfer belt 108, a light source 118, such as an LED, is placed inside the transfer belt 108, and a light receiving portion 119 is provided opposite to the light source 118 such that the transfer belt 108 is placed therebetween.

As the transfer belt 108 rotates at a predetermined velocity, the first through fourth holes 117a, 117b, 117c, and 117d sequentially pass through a space between the light source 118 and the light receiving portion 119. When the first hole 117a passes through a place in which the light source 118 is installed, light radiated from the light source 118 passes through the first hole 117a and is received by the light receiving portion 119 disposed opposite to the light source 118 with respect to the transfer belt 108. The yellow image exposed and developed on the yellow OPC photosensitive drum 100-Y is transferred onto a predetermined line of the transfer belt 108 in response to a first received signal of the light receiving portion 119. Next, when the second hole 117b passes through the space between the light source 118 and the light receiving portion 119, light radiated from the light source 118 passes through the second hole 117b and is received by the light receiving portion 119. The magenta image exposed and developed on the magenta OPC photosensitive drum 100-M is transferred to the predetermined line of the transfer belt 108 in response to a second received signal of the light receiving portion 119.

In the same manner, when the third and fourth holes 117c and 117d pass through the space between the light source 118 and the light receiving portion 119, the cyan and black images exposed and developed on the cyan OPC photosensitive drum 100-C and the black OPC photosensitive drum 100-K are sequentially transferred onto the transfer belt 108 in response to third and fourth receiving signals received by the light receiving portion 119, respectively. Here, the yellow, magenta, cyan, and black images are sequentially transferred from the photosensitive drum for each color and should be repeatedly transferred to a predetermined precise location of the transfer belt 108. Likewise, in order to realize synchronization for each color, the positions of the first through fourth holes 117a, 117b, 117c, and 117d should be consistent with the positions of the photosensitive drums 100-Y, 100-M, 100-C, and 100-K, and a constant rotation velocity or a constant rotation period of the photosensitive drums 100-Y, 100-M, 100-C, and 100-K and the transfer belt 108 should be maintained.

However, in order to realize color synchronization using the above method, an additional light source for synchronization is required around the transfer belt, and thus a power consumption increases, and material and assembly costs increase. In addition, the photosensitive drums and the transfer belt rotate using different driving sources, and thus it is difficult that a rotation velocity of the photosensitive drums and the transfer belt are correctly consistent with each other. Thus, there is a limitation in sensing the positions of the holes formed on the transfer belt and in precisely adjusting a transfer position of the photosensitive drum. Furthermore, as the transfer belt is deformed or expanded due to wear and daily use, the relative positions of the first through fourth holes formed on the transfer belt 108 can be changed. As a result, a transfer time for each color may be detected incorrectly, and transfer positions for each color are inconsistent with one another, thereby a lower quality image is obtained.

SUMMARY OF THE INVENTION

The present invention provides a color synchronization method and a color laser printer which achieves correct color synchronization without providing an additional light source for synchronization of each color.

Additional aspects and advantages of the invention will be set forth in part in the description which follows and, in part, will be obvious from the description, or may be learned by practice of the invention.

According to the above and/or other aspects of the present invention, a color synchronization method used in a color laser printer forms a color image by forming an electrostatic latent image on a photosensitive body using a laser scanning unit and developing and transferring the electrostatic latent image onto a transfer belt and includes providing at least one timing display on a timing belt which rotates the photosensitive body, directing light radiated from the laser scanning unit to be incident on the timing display, detecting the light reflected by or transmitted through the timing display using a light receiving portion, and starting a scanning operation of the laser scanning unit on the photosensitive body which corresponds to the timing display, using a signal detected by the light receiving portion.

According to another aspect of the present invention, a color laser printer forms a color image by forming an electrostatic latent image on a photosensitive body using a laser scanning unit and developing and transferring the electrostatic latent image onto a transfer belt and includes a light source which radiates light, a timing belt which rotates the photosensitive body, a plurality of timing displays provided on the timing belt at a constant interval so that the light radiated from the light source is incident on the timing displays, and a light receiving portion which detects the light reflected by or transmitted through the timing displays. Synchronization for each color is controlled in response to a signal received by the light receiving portion.

According to another aspect of the present invention, there is provided a color laser printer forms a color image by forming an electrostatic latent image on a photosensitive body using a laser scanning unit and developing and transferring the electrostatic latent image onto a transfer belt and includes a plurality of light sources, each of which radiates light, a timing belt which rotates the photosensitive body, a timing display provided on the timing belt, which rotates by a rotation of the timing belt so that the light radiated from each of the light sources is incident on the timing display, and a plurality of light receiving portions, each of which detects the light reflected by or transmitted through the timing display. A scanning operation of the laser scanning unit on the photosensitive body starts in response to a signal received by each of the light receiving portions.

According to another aspect of the present invention, the light source is a light source provided in the laser scanning unit. The timing display is formed of a bar code.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 2A:
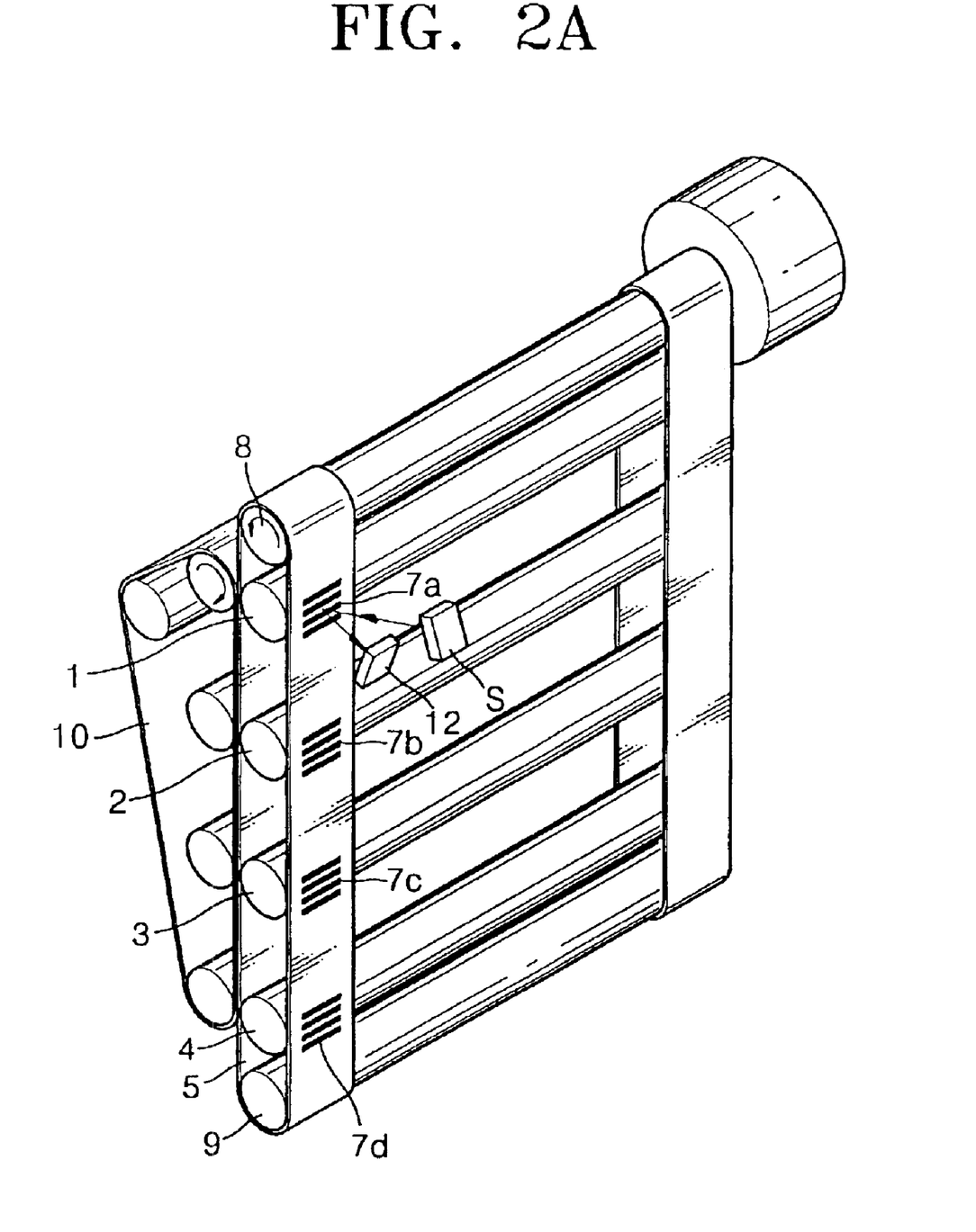
FIG. 2A shows a color laser printer according to an embodiment of the present invention.
Figure 2B:
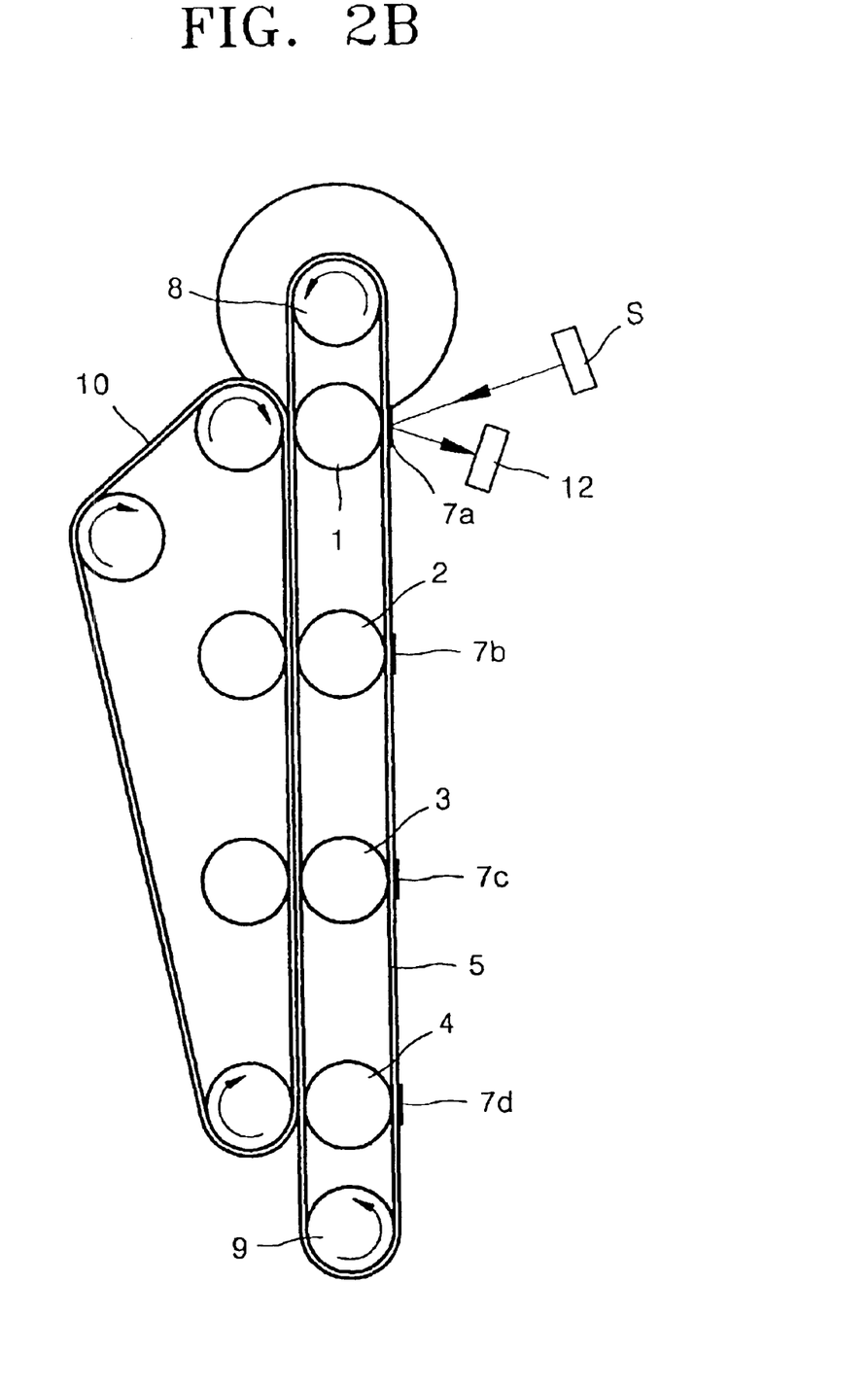
FIG. 2B is a side view of the color laser printer shown in FIG. 2A.

Referring to FIGS. 2A and 2B, a color laser printer according to an embodiment of the present invention includes at least one timing display (for example, timing displays 7a, 7b, 7c, and 7d) provided on a timing belt 5 rotating a plurality of photosensitive bodies placed at predetermined intervals, and a light source S radiating light to be incident on the at last one of the timing displays 7a, 7b, 7c, and 7d, and a light receiving portion 12 receiving the light reflected by the timing displays 7a, 7b, 7c, and 7d. A sprocket wheel 8 and an idle wheel 9 are installed above and under the timing belt 5, respectively.

The photosensitive bodies may be first through fourth photosensitive drums 1, 2, 3, and 4, for example. A transfer belt 10, onto which an image developed on the first through fourth photosensitive drums 1, 2, 3, and 4 is transferred, contacts the first through fourth photosensitive drums 1, 2, 3, and 4. Also, the first through fourth timing displays 7a, 7b, 7c, and 7d are provided on the timing belt 5 at positions which correspond to the first through fourth photosensitive drums 1, 2, 3, and 4. The first through fourth timing displays 7a, 7b, 7c, and 7d may be elements transmitting or reflecting light radiated from the light source S.

Figure 2C:
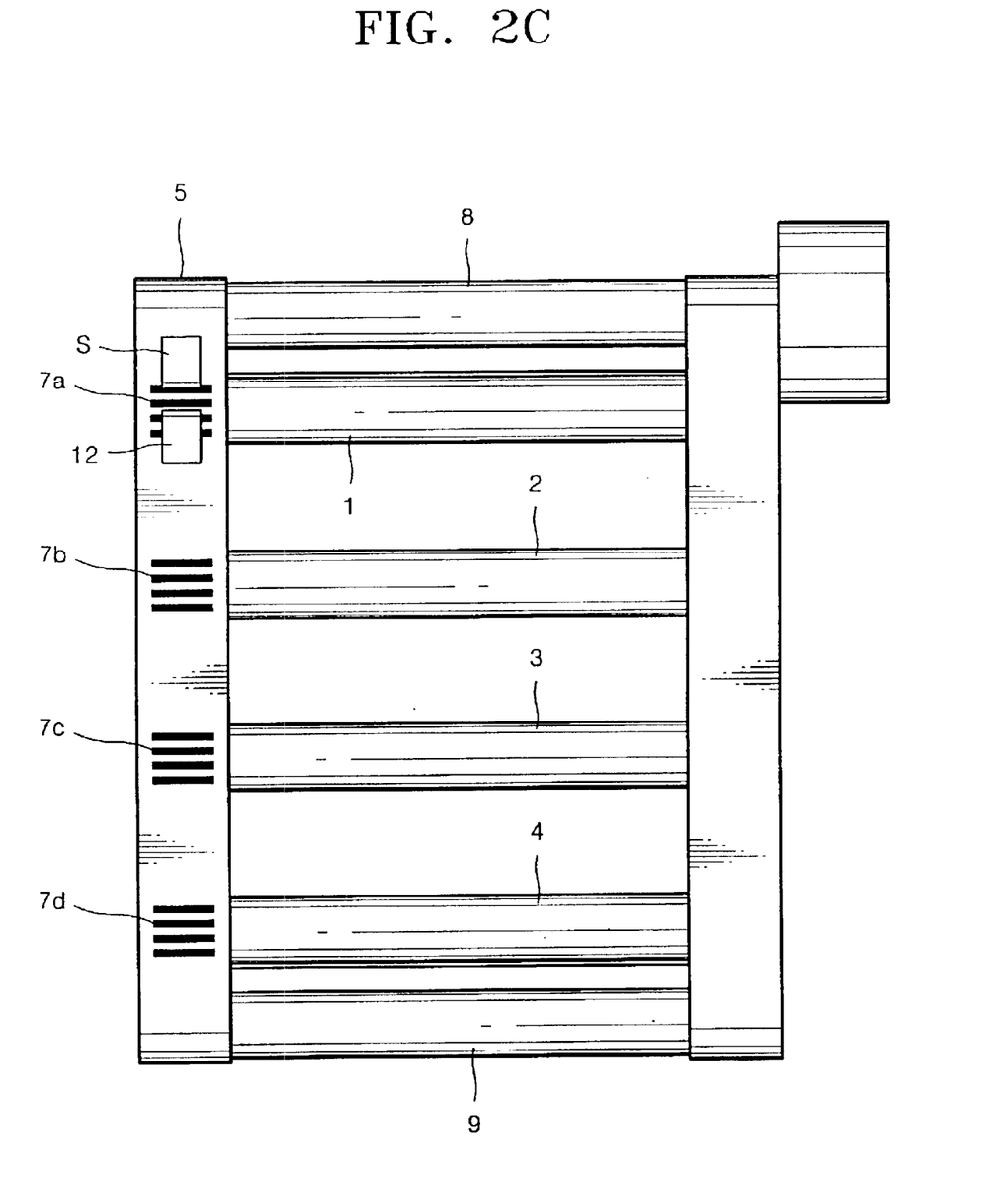
FIG. 2C is a front view of the color laser printer shown in FIG. 2A.

When the timing display 7a, 7b, 7c, or 7d is a transmission-type timing display, the light source S and the light receiving portion 12 are disposed opposite each other, and the timing belt 5 is placed between the light source S and the light receiving portion 12. When the timing display 7a, 7b, 7c, or 7d is a reflection-type timing display, the light source S and the light receiving portion 12 are disposed on the same side of the timing belt 5. For example, the first through fourth timing displays 7a, 7b, 7c, and 7d may be formed of a reflection bar code as shown in FIG. 2C. When the first through fourth timing displays 7a, 7b, 7c, and 7d are formed of the reflection bar code, information on colors or orders may be recorded in the reflection bar code.

Meanwhile, the first through fourth photosensitive drums 1, 2, 3, and 4 rotate at the same rotation velocity as the timing belt 5. After the light radiated from the light source S is incident on the first timing display 7a and reflected therefrom, the reflected light corresponding to a first light signal is detected by the light receiving portion 12. When the light with respect to the first timing display 7a is sensed by the light receiving portion 12, a first scanning operation starts in the first photosensitive drum 1. Next, the timing belt 5 rotates continuously, the light is incident on the second timing display 7b, and then when a second light signal is detected by the light receiving portion 12, a second scanning operation starts in the second photosensitive drum 2.

Even when the light reflected by the third and fourth timing displays 7c and 7d is received, third and fourth scanning operations start in the same manner. In this case, the first through fourth timing displays 7a, 7b, 7c, and 7d are maintained at a constant interval, synchronization for each color can be controlled correctly, and thus a transfer operation is performed on the same position of the transfer belt 10.

Figure 3:
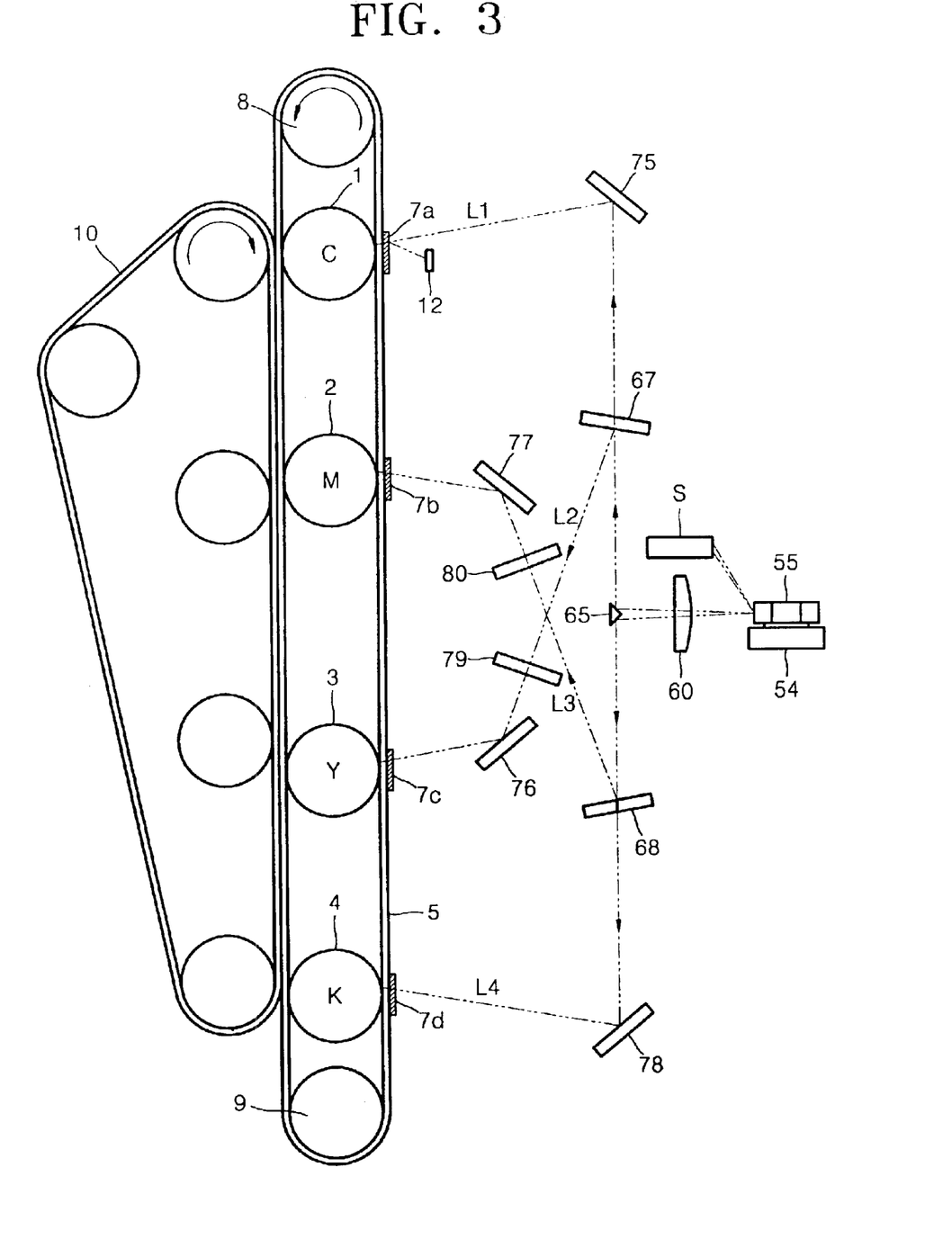
FIG. 3 is a view showing a color synchronization method in the color laser printer shown in FIG. 2.

Here, a light source used in a laser scan unit (LSU) may be used as the light source S. That is, part of the light scanned on the photosensitive drum by the LSU is used to read the first through fourth timing displays 7a, 7b, 7c, and 7d. FIG. 3 shows an example in which the light source of the LSU radiating the light onto the first through fourth timing displays 7a, 7b, 7c, and 7d is used as the light source S. This case indicates the color laser printer which realizes colors using a single LSU.

An operation of the LSU will be described below. The light radiated from the light source S, e.g., the light source of the LSU, is reflected by a rotation polygonal mirror 55 and then is incident on an f-θ lens 60, and the light passing through the f-θ lens 60 is divided into two light paths by a first light path converting unit 65. Subsequently, the incident light is transmitted or reflected along a polarization direction by first and second polarization beam splitters 67 and 68, each of which is arranged on one of the two light paths, is divided into first through fourth light paths L1, L2, L3, and L4 and progresses towards the timing belt 5. Then, second through fifth light path converting units 75, 76, 77, and 78 are properly arranged on the first through fourth light paths L1, L2, L3, and L4 such that the first through fourth light paths L1, L2, L3, and L4 have an identical length.

Due to the light passing along the first through fourth light paths L1, L2, L3, and L4, the first through fourth scanning operations are performed in first through fourth photosensitive drums 1, 2, 3, and 4 for each color. Here, in order to perform the first through fourth scanning operations, part of the radiated light is incident on the timing displays 7a, 7b, 7c, and 7d, and the light transmitted through or reflected by the timing displays 7a, 7b, 7c, and 7d is detected by the light receiving portion 12, thereby controlling color synchronization without providing an additional light source. Reference numerals 79 and 80 denote transmission elements disposed on the second and third light paths L2, L3, respectively.

A method of implementing the color synchronization in the color laser printer having the above structure will be described below.

In the color synchronization method according to the present invention, the timing displays 7a, 7b, 7c, and 7d are provided in the timing belt 5 rotating the photosensitive bodies placed at a predetermined interval, and the light radiated from the light source S is incident on the timing displays 7a, 7b, 7c, and 7d. Here, the photosensitive bodies are the first through fourth photosensitive drums 1, 2, 3, and 4 for each color, and the light source used in the LSU may be used as the light source S without providing an additional light source.

Figure 4:
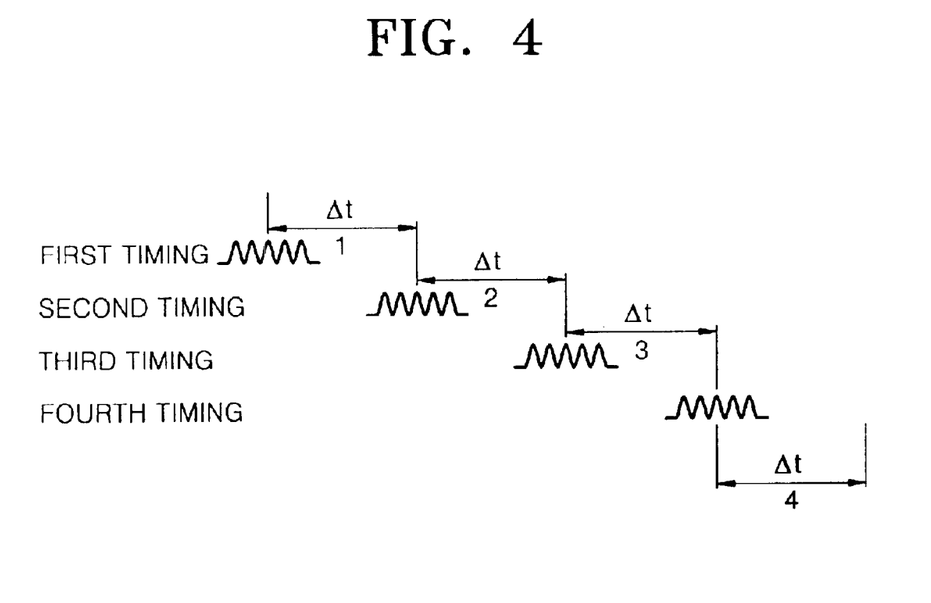
FIG. 4 shows a principle of the color synchronization method shown in FIG. 3.

Next, the light transmitted or reflected by the first through fourth timing displays 7a, 7b, 7c, and 7d is detected by the light receiving portion 12 using the light radiated from the light source S. Referring to FIG. 4, a first timing when the first scanning operation starts in the first photosensitive drum 1, is determined by detecting the light transmitted or reflected by the first timing display 7a. Then, a second timing when the second scanning operation starts in the second photosensitive drum 2, is determined by detecting the light transmitted or reflected by the second timing display 7b. In this way, third and the fourth timings are determined. Each scanning operation is performed in the corresponding photosensitive drum 1, 2, 3, or 4 which corresponds to the timing display 7a, 7b, 7c, or 7d, using a signal detected using the above method, and each color image is overlapped with other color images, and the overlapped color images are transferred on a predetermined position of the transfer belt 10.

According to the present invention, the first through fourth timing displays 7a, 7b, 7c, and 7d are provided on the timing belt 5, and thus the timing displays 7a, 7b, 7c, and 7d move at the same velocity as the photosensitive drums. Thus, an instant of time when the scanning operation and the transfer operation for each color are performed, can be adjusted correctly, thereby realizing the color synchronization.

Figure 5A:
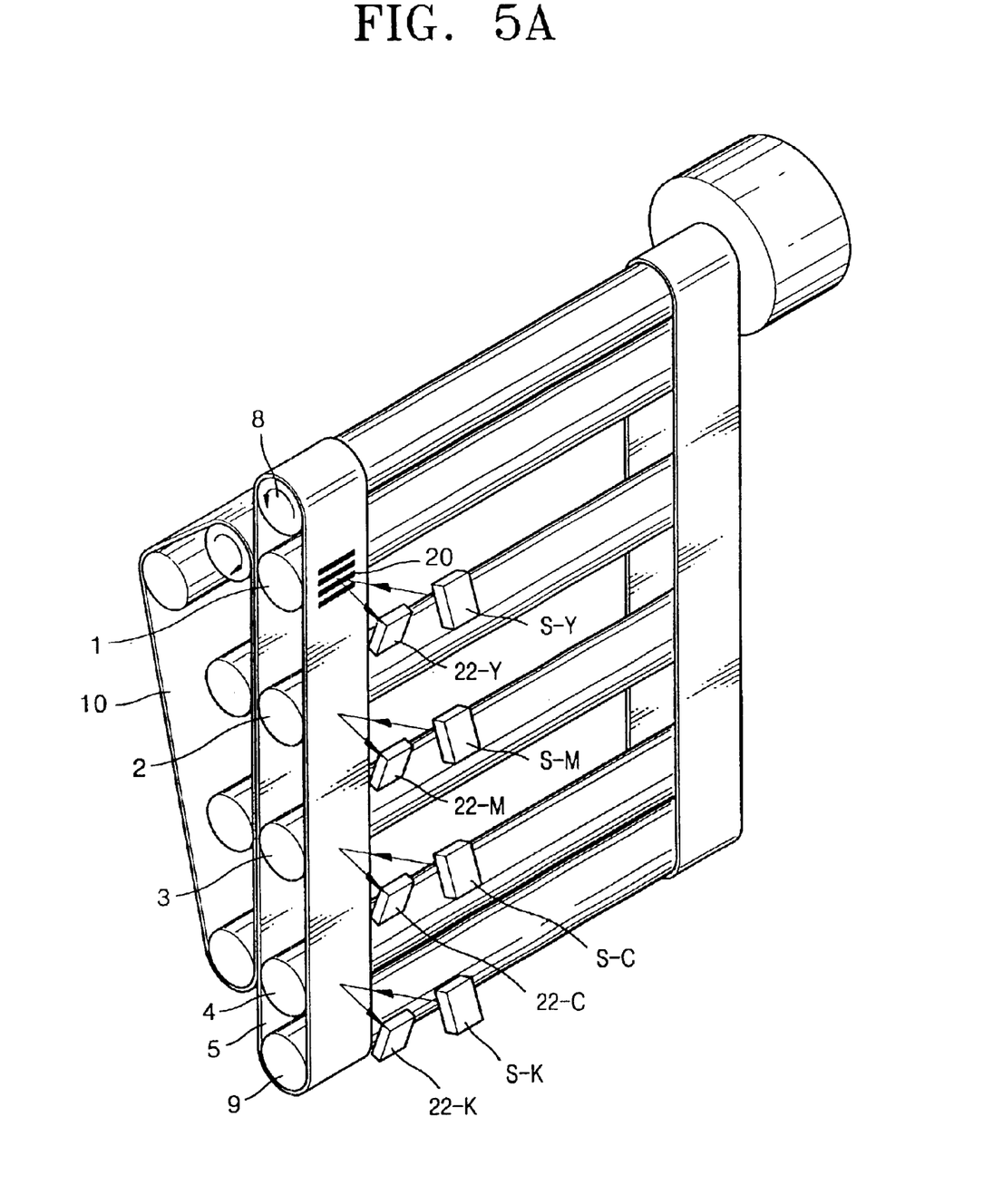
FIG. 5A shows another color laser printer according to another embodiment of the present invention.
Figure 5B:
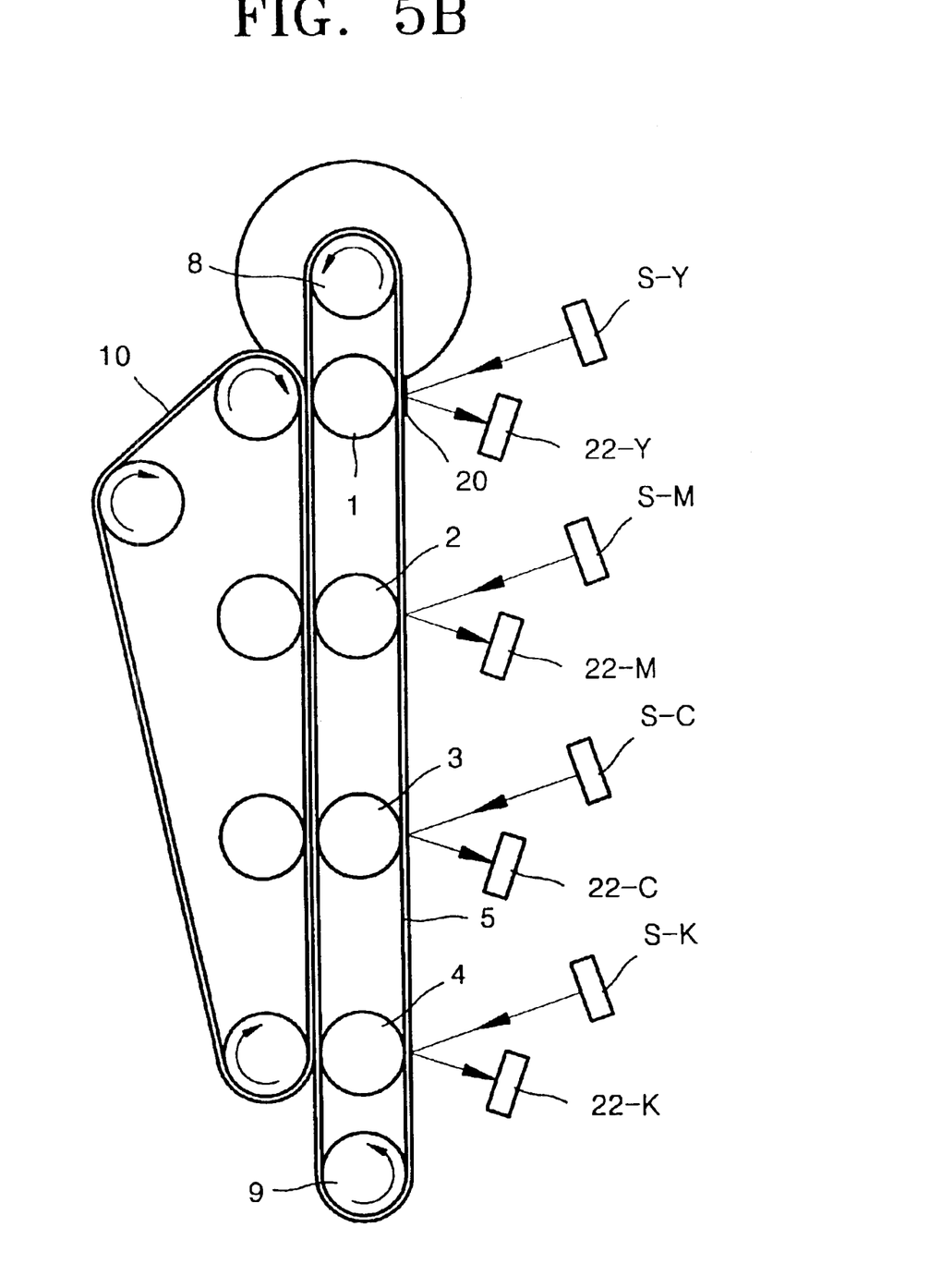
FIG. 5B is a side view of the color laser printer shown in FIG. 5A.

FIG. 5A shows a perspective view illustrating another color laser printer according to another embodiment of the present invention. Referring to FIG. 5A, the color laser printer includes one timing display 20 formed on the timing belt 5 rotating the photosensitive bodies, e.g., the photosensitive drums 1, 2, 3, and 4, a plurality of light sources S-Y, S-M, S-C, and S-K radiating light on the timing display 20, and a plurality of light receiving portions 22-Y, 22-M, 22-C, and 22-K receiving the light reflected by the timing display 20. Here, elements having the same reference numerals as those of FIG. 2A perform the same functions, and thus detailed descriptions thereof will be omitted.

Unlike the above-mentioned embodiment shown in FIGS. 2A through 3, the timing display 20 is formed on the timing belt 5, and the light sources S-Y, S-M, S-C, and S-K and the light receiving portions 22-Y, 22-M, 22-C, and 22-K are provided for each color. The light sources S-Y, S-M, S-C, and S-K and the light receiving portions 22-Y, 22-M, 22-C, and 22-K may be provided for respective colors, for example, yellow (Y), magenta (M), cyan (C), and black (K). In the above structure, the timing display 20 moves as the timing belt 5 rotates.

Thus, assuming that the timing display 20 is placed in a position which corresponds to the first photosensitive drum 1, the light radiated from the yellow light source S-Y is reflected by the timing display 20 and is received by the yellow light receiving portion 22-Y. When a light signal is detected by the yellow light receiving portion 22-Y, the first scanning operation starts in the first photosensitive drum 1. Subsequently, when the timing display 20 moves and is placed in a position which corresponds to the second photosensitive drum 2, the light radiated from the magenta light source S-M is reflected by the timing display 20 and is detected by the magenta light receiving portion 22-M. The second scanning operation starts in the second photosensitive drum 2 in response to the detected signal.

Subsequently, as the timing display 20 moves, the cyan light source S-C and the cyan light receiving portion 22-C, and the black light source S-K and the black light receiving portion 22-K sequentially operate, and the third and fourth scanning operations start in the corresponding third and fourth photosensitive drums 3, 4 in the same manner described above. In this way, the instant of time when each of the first through fourth scanning operations starts in the corresponding photosensitive drum 1, 2, 3, or 4 for each color, can be adjusted correctly. In particular, it is possible that the timing display 20 is formed on the timing belt 5 rotating the photosensitive drums 1, 2, 3, and 4 such that the moving velocity of the timing display 20 is consistent with the rotation velocity of the photosensitive drums 1, 2, 3, and 4, and thus the instant of time when the scanning operation starts in the photosensitive drum 1, 2, 3, or 4 for each color, can be precisely adjusted.

Here, the light sources S-Y, S-M, S-C, and S-K can be replaced with the light source provided in the LSU (see FIG. 3), as described above. In addition, although the reflection timing display 20 has been described, a transmission timing display may be also used.

As described above, in the color synchronization method and the color laser printer according to the present invention, the number of components and manufacturing costs can be reduced using the light source provided in the LSU without requiring any additional light source for the color synchronization. In addition, at least one timing display is provided on the timing belt, a scanning and transfer time is controlled by detecting the light reflected or transmitted by the timing display, and further, the timing display is provided on the timing belt rotating the photosensitive body, thereby realizing a correct color synchronization and improving a quality of the color image.

Meanwhile, according to one aspect of the present invention, when a plurality of timing displays are provided, and each one of the light sources and the light receiving portions are provided, it is advantageous to reduce the number of components. According to another aspect of the present invention, when one timing display is provided on the timing belt, and the light source and the light receiving portion are provided for each color, it is advantageous to control the color synchronization.

While this invention has been particularly shown and described with reference to preferred embodiments thereof, it will be understood by those skilled in the art that various changes in form and details may be made therein without departing from the spirit and scope of the invention as defined by the appended claims and their equivalents.

What is claimed is:

1. A color laser printer which forms a color image by forming an electrostatic latent image on a photosensitive body using a laser scanning unit, developing the electrostatic latent image, and transferring the developed image onto a transfer belt, the printer comprising:
   a light source which radiates light;
   a timing belt which rotates the photosensitive body;
   a plurality of timing displays which are provided on the timing belt at a constant interval, and on which the light radiated from the light source is incident; and
   a light receiving portion which detects the light reflected or transmitted by the timing displays and generates a signal;
   wherein synchronization for each color of the color image is controlled in response to the signal generated by the light receiving portion.

2. The printer of claim 1, wherein the photosensitive body comprises a magenta photosensitive drum, a cyan photosensitive drum, a yellow photosensitive drum, and a black photosensitive drum, and the plurality of timing displays are provided on the timing belt at positions which correspond to the photosensitive drums.

3. The printer of claim 2, wherein the laser scanning unit uses the light source to form the electrostatic latent image on the photosensitive body.

4. The printer of claim 2, wherein each of the plurality of timing displays includes a bar code.

5. A color laser printer which forms a color image by forming an electrostatic latent image on a photosensitive body using a laser scanning unit, developing the electrostatic latent image, and transferring the developed image onto a transfer belt, the printer comprising:
   a plurality of light sources, which radiate light;
   a timing belt which rotates the photosensitive body;
   a timing display which is provided on the timing belt, which rotates by a rotation of the timing belt, and on which the light radiated from each of the light sources is incident; and
   a plurality of light receiving portions, each of which detects the light reflected or transmitted by the timing display and generates a signal;
   wherein a scanning operation starts in the photosensitive body in response to the signal received by each of the light receiving portions.

6. The printer of claim 5, wherein the photosensitive body comprises a magenta photosensitive drum, a cyan photosensitive drum, a yellow photosensitive drum, and a black photosensitive drum, and the light sources and the light receiving portions are provided at position which correspond to the photosensitive drums.

7. The printer of claim 6, wherein the laser scanning unit uses the plurality of light sources to form the electrostatic latent image on the photosensitive body.

8. The printer of claim 6, wherein the timing display includes a bar code.

9. The printer of claim 5, wherein the laser scanning unit uses the plurality of light sources to form the electrostatic latent image on the photosensitive body.

10. The printer of claim 1, wherein the laser scanning unit uses the plurality of light sources to form the electrostatic latent image on the photosensitive body.

11. A color synchronization method used in a color laser printer which forms a color image by forming an electrostatic latent image on a photosensitive body using a laser scanning unit, developing the electrostatic latent image, and transferring the developed image onto a transfer belt, the method comprising:
   causing at least one timing display to be formed on a timing belt which rotates the photosensitive body;
   causing light radiated from the laser scanning unit to be incident on the timing display;
   detecting the light reflected or transmitted by the timing display using a light receiving portion; and
   starting a scanning operation in the photosensitive body which corresponds to the timing display, using a signal detected by the light receiving portion.

12. The method of claim 11, wherein the photosensitive body comprises a magenta photosensitive drum, a cyan photosensitive drum, a yellow photosensitive drum, and a black photosensitive drum, and the at least one timing display is disposed on the timing belt at a position which corresponds to the photosensitive drums.

13. The method of claim 11, wherein the photosensitive body comprises a magenta photosensitive drum, a cyan photosensitive drum, a yellow photosensitive drum, and a black photosensitive drum, and a light source and the light receiving portion are disposed adjacent to the timing belt which corresponds to the photosensitive drums.

14. The method of claim 13, wherein the at least one timing display includes a bar code.

15. The method of claim 12, wherein the at least one timing display includes a bar code.

16. A color laser printer which forms a color image by forming an electrostatic latent image on a photosensitive body using light generated from a light source of a laser scanning unit, developing the electrostatic latent image, and transferring the developed image onto a transfer belt, the printer comprising:
   a timing belt which rotates the photosensitive body;
   a timing display which is formed on the timing belt to direct the light generated from the light source of the laser scanning unit; and
   a light receiving portion which generates a signal in response to the light directed from the timing display to control the photosensitive body.

17. The printer of claim 16, wherein the timing display comprises:
   a code having information representing one of a color of the color image and an order when the laser scanning unit scans the photosensitive body.

18. The printer of claim 16, wherein the timing display comprises:
   a code representing a scanning operation of the laser scanning unit.

19. The printer of claim 16, wherein the timing display comprises:
   timing information representing synchronization between the photosensitive body and the laser scanning unit.

20. The printer of claim 16, wherein the timing display comprises:
   timing information representing synchronization between the photosensitive body and the transfer belt.

21. The printer of claim 16, wherein the timing display comprises:
   a code representing the photosensitive body.

22. The printer of claim 16, wherein the photosensitive body comprises a plurality of photosensitive drums, and the timing belt rotates the photosensitive drums at the same speed.

23. The printer of claim 22, wherein the photosensitive drums are disposed to be spaced-apart from each other at intervals in an inside of the timing belt.

24. The printer of claim 22, further comprising:
   a sprocket wheel rotating the timing belt.

25. The printer of claim 24, further comprising
   an idle wheel disposed spaced-apart from the sprocket wheel, wherein the photosensitive drums are disposed between the sprocket wheel and the idle wheel to contact the timing belt.

26. The printer of claim 25, wherein the photosensitive drums are disposed to be spaced-apart from each other at intervals between the sprocket wheel and the idle wheel.

27. The printer of claim 22, wherein the laser scanning unit forms a plurality of sub-electrostatic latent images on corresponding ones of the photosensitive drums, and the timing display comprises:
   a code having information representing one of sub-electrostatic latent images.

28. The printer of claim 22, wherein the timing display comprises:
   a code representing an order of the photosensitive drums with respect to the timing belt.

29. The printer of claim 22, wherein the timing display comprises:
   a code representing one of scanning operations of the laser scanning unit on the photosensitive drums.

30. The printer of claim 22, wherein the timing display comprises:
   timing information representing synchronization between the photosensitive drums and the laser scanning unit.

31. The printer of claim 22, wherein the timing display comprises:
   timing information representing synchronization between the photosensitive drums and the transfer belt.

32. The printer of claim 22, wherein the timing display comprises:
   a code representing one of the photosensitive drums.

33. The printer of claim 22, wherein the timing display comprises:
   a plurality of sub-timing displays formed on the timing belt.

34. The printer of claim 33, wherein the sub-timing displays are disposed on positions corresponding to respective ones of the photosensitive drums.

35. The printer of claim 33, wherein the sub-timing displays comprise:
   different information each representing one of different colors of the color image.

36. The printer of claim 33, wherein the sub-timing displays comprise:
   common information representing arrangement of the photosensitive drums.

37. The printer of claim 33, wherein the sub-timing displays comprise:
   a code representing one of different colors.

38. The printer of claim 33, wherein the sub-timing displays comprise:
   a code representing timing information about one of the laser scanning unit, the photosensitive drums, and the transfer belt.

39. The printer of claim 33, wherein the light receiving portion comprises:
   a plurality of sub-light receiving portions corresponding to the respective ones of the sub-timing displays to generates timing signals.

40. The printer of claim 39, wherein the laser scanning unit scans the photosensitive drums in accordance with corresponding ones of the timing signals.

41. The printer of claim 39, wherein the timing signals are sequentially generated with a time interval.

42. The printer of claim 39, wherein the timing signals do not overlap.

43. The printer of claim 33, further comprising:
   a light directing unit directing the light from the light source of the laser scanning unit to the sub-timing displays.

44. The printer of claim 43, wherein the light directing unit comprises:
   a plurality of light path converting units converting a light path of the light into a plurality of light paths corresponding to the respective ones of the sub-timing displays.

45. The printer of claim 43, wherein the light directing unit comprises:
   a rotation polygonal mirror.

46. The printer of claim 43, wherein the light directing unit comprises:

an f-θ lens.

47. The printer of claim 22, wherein the light is directed to be incident to the timing display of the timing belt from the laser scanning unit while the light is incident to the photosensitive drums.

48. The printer of claim 22, wherein the laser scanning unit scans the timing display using the light when scanning one of the photosensitive drums using the light in response to the signal.

49. The printer of claim 22, wherein the laser scanning unit scans the photosensitive drums using the light in response to the signal.

50. The printer of claim 22, wherein the laser scanning unit scans one of the photosensitive drums using the light in response to the signal.

51. The printer of claim 16, further comprising:

a light directing unit directing the light from the light source of the laser scanning unit to the timing display.

52. The printer of claim 16, wherein the timing display comprises a transmission-type display, and the light receiving portion receives the light transmitted through the timing display.

53. The printer of claim 52, wherein the light receiving portion and the timing display are disposed opposite each other with respect to the timing belt.

54. The printer of claim 16, wherein the timing display comprises a reflective-type display, and the light receiving portion receives the light reflected from the timing display.

55. The printer of claim 54, wherein the light receiving portion and the timing display are disposed on the same side of the timing belt.

56. The printer of claim 54, wherein the light receiving portion, the timing display, and the laser scanning unit are disposed on the same side of the timing belt.

57. The printer of claim 16, wherein the timing display is not formed on the transfer belt.

58. A color laser printer which forms a color image by forming an electrostatic latent image on a photosensitive body, developing the electrostatic latent image, and transferring the developed image onto a transfer belt, the printer comprising:

a timing belt which rotates the photosensitive body;

a timing display which formed on the timing belt; and a single laser scanning unit radiating light used for both forming the electrostatic latent image on the photosensitive body and detecting the timing display to control the photosensitive body.

59. A color synchronization method used in a color laser printer which forms a color image by forming an electrostatic latent image on a photosensitive body using a laser scanning unit, developing the electrostatic latent image, and transferring the developed image onto a transfer belt, the method comprising:

rotating a timing belt which rotates the photosensitive body;

causing a timing display to be formed on the timing belt;

directing the light generated from the light source of the laser scanning unit; and generates a signal in response to the light directed from the timing display to control one of the laser scanning unit and the photosensitive body.

* * * * *

UNITED STATES PATENT AND TRADEMARK OFFICE
CERTIFICATE OF CORRECTION

PATENT NO.    : 6,888,555 B2
DATED         : May 3, 2005
INVENTOR(S)   : Bu-hyun Sung et al.

It is certified that error appears in the above-identified patent and that said Letters Patent is hereby corrected as shown below:

Column 8,
Line 29, change "position" to -- positions --.

Signed and Sealed this

Nineteenth Day of July, 2005

JON W. DUDAS
*Director of the United States Patent and Trademark Office*